United States Patent
Chen et al.

(10) Patent No.: US 12,450,910 B2
(45) Date of Patent: Oct. 21, 2025

(54) METHOD AND SYSTEM FOR PROCESS MONITORING

(71) Applicant: The Boeing Company, Arlington, VA (US)

(72) Inventors: Yang Chen, Westlake Village, CA (US); Deepak Khosla, Camarillo, CA (US); Brandon Michael Courter, Indianapolis, IN (US); Shane Edward Arthur, Kirkland, WA (US); Jeremy Daniel Howe, Everett, WA (US); Anders Eirik Heussy, Seattle, WA (US)

(73) Assignee: The Boeing Company, Arlington, VA (US)

( * ) Notice: Subject to any disclaimer, the term of this patent is extended or adjusted under 35 U.S.C. 154(b) by 107 days.

(21) Appl. No.: 18/334,012

(22) Filed: Jun. 13, 2023

(65) Prior Publication Data

US 2024/0420471 A1 Dec. 19, 2024

(51) Int. Cl.
*G06V 20/52* (2022.01)
*G06T 7/20* (2017.01)
*G06V 10/25* (2022.01)
*G06V 20/40* (2022.01)

(52) U.S. Cl.
CPC ............. *G06V 20/52* (2022.01); *G06T 7/20* (2013.01); *G06V 10/25* (2022.01); *G06V 20/44* (2022.01); *G06V 2201/07* (2022.01)

(58) Field of Classification Search
None
See application file for complete search history.

(56) References Cited

U.S. PATENT DOCUMENTS

2024/0058965 A1* 2/2024 Stanton .................. B25J 9/1697
2024/0201779 A1* 6/2024 Li ......................... H04N 7/0255

FOREIGN PATENT DOCUMENTS

CN 111144262 B 5/2023

OTHER PUBLICATIONS

European Patent Office, Extended European Search Report Issued in Application No. 24177066.8, Nov. 26, 2024, Germany, 9 pages.

* cited by examiner

*Primary Examiner* — Eileen M Adams
(74) *Attorney, Agent, or Firm* — Alleman Hall & Tuttle LLP

(57) ABSTRACT

A method of monitoring an assembly process is disclosed herein. The method includes obtaining an event model for each of a plurality of objects in the assembly process with the event model for each of the plurality of objects including a predetermined time frame for a change in presence to occur. The method includes collecting an image sequence of the assembly process for monitoring and identifying if a change in presence for each of the plurality of objects occurred with a detector model. The method further includes reviewing the event model for each of the plurality of objects to determine if the predetermined time frame lapsed without the change in presence of a corresponding one of the plurality of objects being identified and issuing an alert if the predetermined time frame lapsed without the presence of a corresponding one of the plurality of objects being identified.

20 Claims, 6 Drawing Sheets

| # | Configurations: |
|---|---|
| 1 | Fuselage |
| 2 | Tail Cone Delivered |
| 3 | Tail Cone Attached |
| 4 | Vertical Fin Delivered |
| 5 | Vertical Fin Attached |
| 6 | Wing Right Delivered |
| 7 | Wing Left Delivered |
| 8 | Wing Right Loaded |
| 9 | Wing Left Loaded |

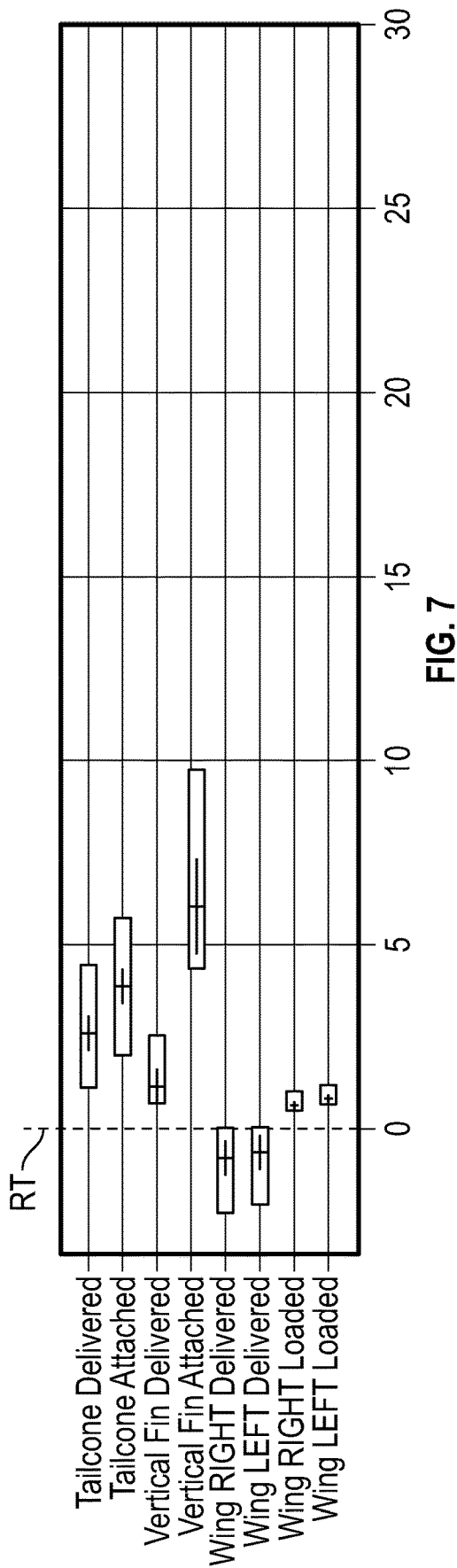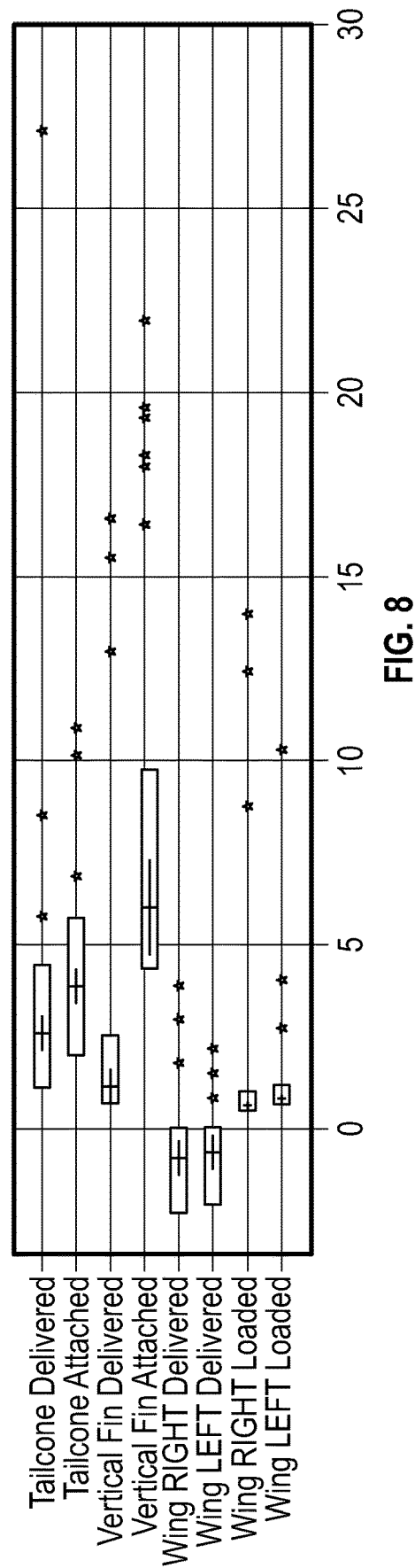

METHOD AND SYSTEM FOR PROCESS MONITORING

FIELD

The present disclosure relates to a system and a method for generating a detector model, and in particular, to a detector model for process monitoring to determine delay in an assembly process.

BACKGROUND

Machine learning is a process that analyzes to determine a model that maps input data to output data. One type of machine learning is supervised learning in which a model is trained with a dataset including known output data for a sufficient amount of input data. Once a model is trained, it may be deployed, i.e., applied to new input data to predict the expected output.

Machine learning may be applied to regression problems (where the output data are numeric, e.g., a voltage, a pressure, a number of cycles) and to classification problems (where the output data are labels, classes, and/or categories, e.g., pass-fail, failure type, etc.). For both types of problems, a broad array of machine learning algorithms is available, with new algorithms the subject of active research. However, it can be very labor intensive to generate the dataset to train the model. Also, the quality of the dataset provided for training can greatly influence the ability of the model to predict the expected output from a new dataset.

Therefore, there exists a need to improve input datasets used to train a model and the expected outputs it predicts to determine delays in an assembly process.

DESCRIPTION OF THE DRAWINGS

Some embodiments of the present disclosure are now described, by way of example only, and with reference to the accompanying drawings. The same reference number represents the same element or the same type of element on all drawings.

FIG. 7 illustrates event relative times plotted for the assembly activities of FIG. 6.

FIG. 8 illustrates anomalies for the event relative times plotted in FIG. 7.

SUMMARY

Figure 1:
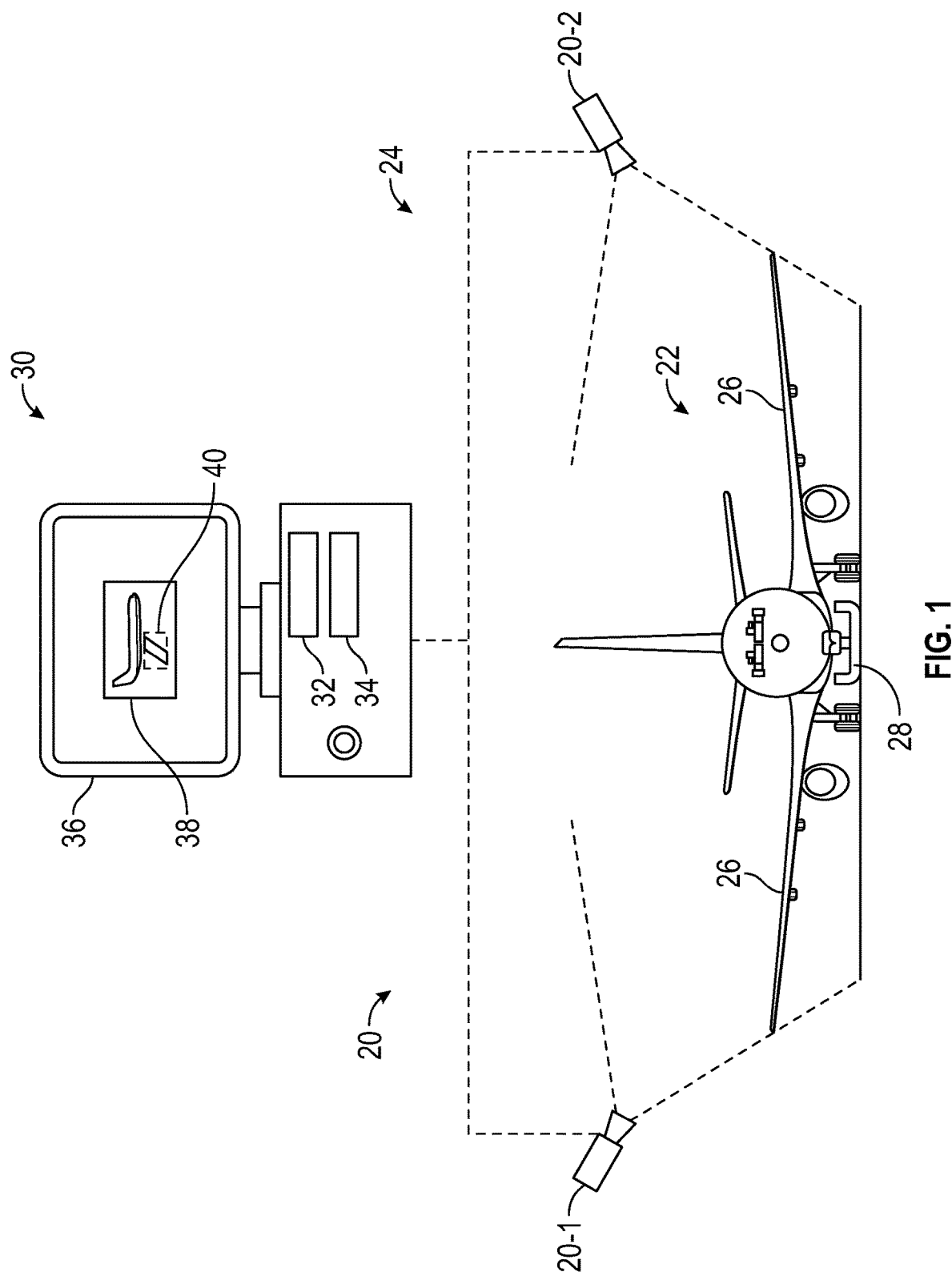
FIG. 1 illustrates an example camera and computer system used in connection in an assembly line.

A method of monitoring an assembly process is disclosed herein. The method includes obtaining an event model for each of a plurality of objects in the assembly process with the event model for each of the plurality of objects including a predetermined time frame for a change in presence to occur. The method includes collecting an image sequence of the assembly process for monitoring and identifying if a change in presence for each of the plurality of objects occurred with a detector model. The method further includes reviewing the event model for each of the plurality of objects to determine if the predetermined time frame lapsed without the change in presence of a corresponding one of the plurality of objects being identified and issuing an alert if the predetermined time frame lapsed without the presence of a corresponding one of the plurality of objects being identified.

In one or more embodiments of the method, results from the detector model identifying the change in presence for each of the plurality of objects is filtered with a state machine based on if the objected was detected in at least one image proceeding or following.

In one or more embodiments of the method, identifying the change in presence for each of the plurality of objects includes determining a time when each of the plurality of objects either appeared or disappeared from the image sequence.

In one or more embodiments of the method, the time is based on a relative time set by the change in presence of one of the plurality of objects.

In one or more embodiments of the method, the plurality of objects includes multiple configurations of a single object.

In one or more embodiments of the method, collecting the image sequence of the assembly process occurs in real time.

In one or more embodiments of the method, the event model for each of the plurality of objects is generated by receiving at least one training image sequence having a plurality of occurrences of the assembly process illustrating each of the plurality of objects and utilizing the detector model to identify the presence of each of the plurality of objects in the at least one training image sequence. Further, generating the event model corresponding to each of the plurality of objects based on a statistical prediction for when the object should appear in the training image sequence.

In one or more embodiments of the method, the statistical prediction includes a predetermined time frame for the presence of a corresponding one of the plurality objects.

In one or more embodiments of the method, the predetermined time frame is based on three times a standard deviation of a mean occurrence time for the presence of a corresponding one of the plurality of objects.

In one or more embodiments of the method, the predetermined time frame includes a relative time based on the presence of one of the plurality of objects.

In one or more embodiments of the method, the plurality of occurrences of the assembly process includes historical occurrences of the assembly process.

In one or more embodiments of the method, the detector model is trained by obtaining a separate training dataset corresponding to each of the plurality of objects with each of the separate training datasets including a set of tagged images identifying a corresponding one of the plurality of objects. The detector model is further trained by training a parts-level detectors based on each of the separate training dataset and training the detector model based on each of the parts-level detectors.

In one or more embodiments of the method, the separate training dataset are created by receiving separate image sequences for each of the plurality of objects with a corresponding one of the plurality of objects identified in at least one image of the separate image sequence, tracking the each of the plurality of objects identified in the at least one image in a corresponding one of the separate image sequences. The separate training datasets are further created by tagging a region of interest in each image in the separate image sequences where a corresponding one of each of the plurality of objects was tracked and creating the separate training dataset for each of the plurality of objects by collecting the region of interest from each image in each of the separate image sequences where the corresponding object was tracked.

In one or more embodiments of the method, obtaining the separate training dataset corresponding to each of the plurality of objects includes eliminating false negative tags by verifying a presence of each of the plurality of objects in each of the plurality of training dataset against a ground-truth timeline for each of the plurality of objects.

A system for detecting objects in an assembly process is disclosed herein. The system includes at least one camera configured to capture a plurality of images and a controller. The controller configured to obtain an event model for each of a plurality of objects in the assembly process, wherein the event model for each of the plurality of objects includes a predetermined time frame for a change in presence to occur and collect an image sequence of the assembly process for monitoring. The controller is also configured to identify if a change in presence for each of the plurality of objects occurred with a detector model and review the event model for each of the plurality of objects to determine if the predetermined time frame lapsed without the change in presence of a corresponding one of the plurality of objects being identified. The controller is further configured to issue an alert if the predetermined time frame lapsed without the presence of a corresponding one of the plurality of objects being identified.

In one or more embodiments of the system, results from the detector model identifying the change in presence for each of the plurality of objects is filtered with a state machine based on if the objected was detected in at least one image proceeding or following.

In one or more embodiments of the system, the event model for each of the plurality of objects is generating by receiving at least one training image sequence having a plurality of occurrences of the assembly process illustrating each of plurality of objects, utilizing the detector model to identify the presence of each of the plurality of objects in the at least one image sequence, and generating the event model corresponding to each of the plurality of objects based on a statistical prediction for when the object should appear in the training image sequence.

A non-transitory computer-readable storage medium embodying programmed instructions which, when executed by a processor, are operable for performing a method is disclosed herein. The method includes obtaining an event model for each of a plurality of objects in an assembly process, wherein the event model for each of the plurality of objects includes a predetermined time frame for a change in presence to occur and collecting an image sequence of the assembly process for monitoring. The method includes identifying if a change in presence for each of the plurality of objects occurred with a detector model and reviewing the event model for each of the plurality of objects to determine if the predetermined time frame lapsed without the change in presence of a corresponding one of the plurality of objects being identified. The method further includes issuing an alert if the predetermined time frame lapsed without the presence of a corresponding one of the plurality of objects being identified.

In one or more embodiments of the method, the event model for each of the plurality of objects is generating by receiving at least one training image sequence having a plurality of occurrences of the assembly process illustrating each of plurality of objects, utilizing the detector model to identify the presence of each of the plurality of objects in the at least one image sequence, and generating the event model corresponding to each of the plurality of objects based on a statistical prediction for when the object should appear in the training image sequence.

In one or more embodiments of the method, the detector model is trained by obtaining a separate training dataset corresponding to each of the plurality of objects with each of the separate training datasets including a set of tagged images identifying a corresponding one of the plurality of objects, training a parts-level detectors based on each of the separate training datasets, and training the detector model based on each of the parts-level detectors.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

DESCRIPTION

The Figures and the following description illustrate specific exemplary embodiments of the disclosure. A person of ordinary skill in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below, but by the claims and their equivalents.

FIG. 1 illustrates an example camera system 20 having a first camera 20-1 and a second camera 20-2 for monitoring an assembly process, such as an assembly of an airplane 22 on an assembly line. The camera system 20 is in communication with a computer system 30 that receives images from the camera system 20. Although the illustrated example of the camera system 20 and computer system 30 is shown in relation to an assembly process, this disclosure applies to other areas where it is desirable to perform object detection.

While the computer system 30 of FIG. 1 is depicted as a unitary computer module for illustrative simplicity, the computer system 30 can be physically embodied as one or more processing nodes having a non-transitory computer-readable storage medium 34, i.e., application-sufficient memory, and associated hardware and software, such as but not limited to a high-speed clock, timer, input/output circuitry, buffer circuitry, and the like. The computer-readable storage medium 34 may include enough read only memory, for instance magnetic or optical memory. Computer-readable code or instructions embodying the methods described below may be executed during operation of the computer system 30. To that end, the computer system 30 may encompass one or more processors 32, e.g., logic circuits, application-specific integrated circuits (ASICs), central processing units, microprocessors, and/or other requisite hardware as needed to provide the programmed functionality described herein. A display screen 36 may be connected to or in communication with the computer readable medium 34 and processor(s) 32 to facilitate a graphical interface for a user implementing this disclosure as set forth below.

In the illustrated example, the cameras 20-1 and 20-2 are mounted above an aircraft assembly line 24 on opposite lateral sides of the aircraft 22 for the purpose of monitoring the process of assembling the aircraft 22. Depending on the process being monitored, the cameras 20-1 and 20-2 can capture images at a 4K resolution and up to thirty or more frames per second. Alternatively, the cameras 20-1, 20-2 can capture images at a lower resolution, such as 960×540, and at a rate of one image every 15 seconds. The variation in camera resolution and image capture rate depends on the size of the objects being detected and a length of time that the objects remain in a field of view of the cameras 20-1, 20-2. Also, collecting images at a lower resolution and rate reduces an amount of data that needs to be stored and handled by the computer system 30.

Also, this disclosure applies to camera systems 20 that use only a single camera or more than two cameras to capture images of a specific area. The number of cameras utilized for process monitoring depends on the required view needed to include the objects to be detected as some of the cameras may have an obstructed view of one or more objects.

Figure 2:
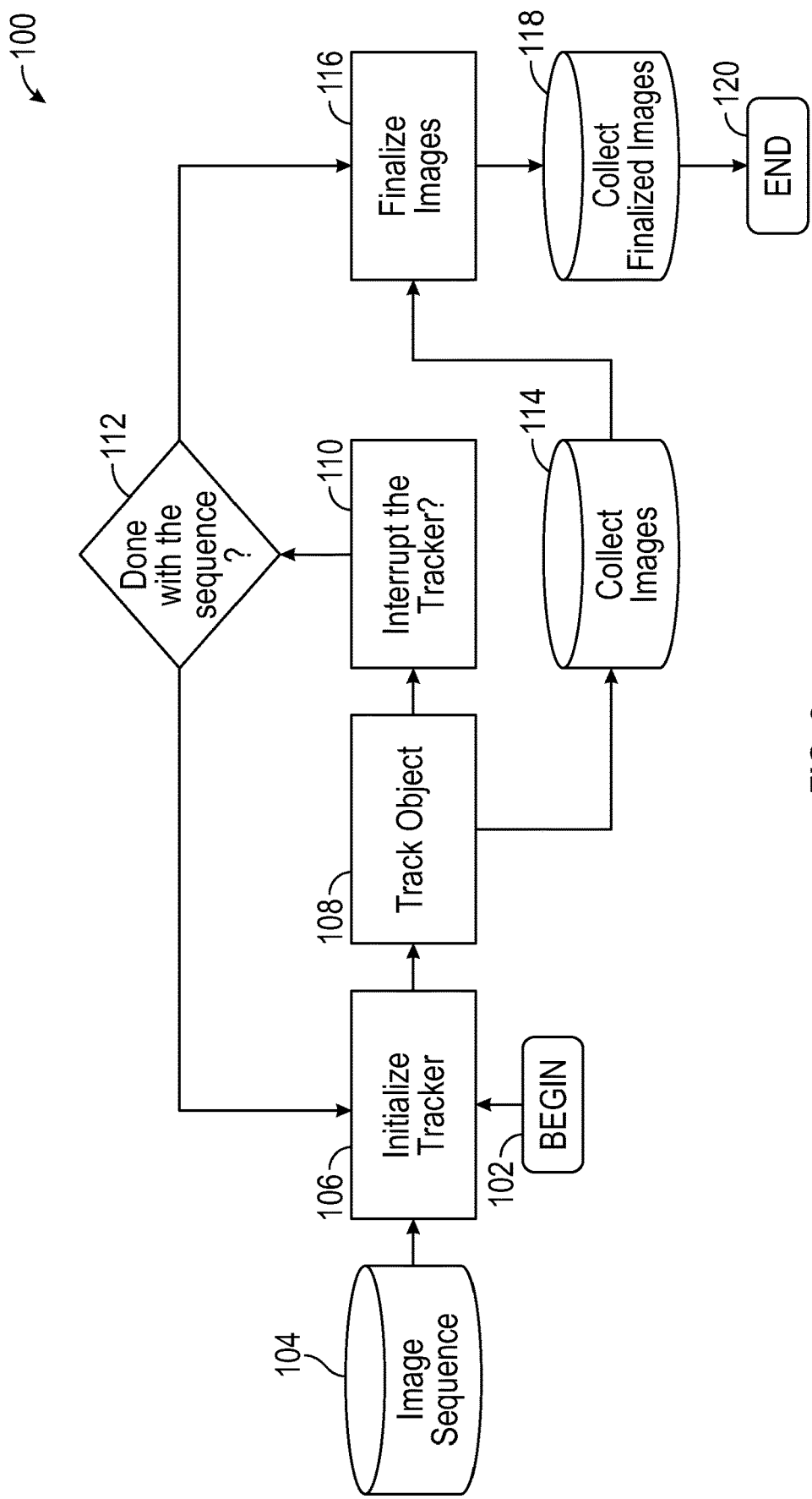
FIG. 2 illustrates an example method of generating a training dataset for an object for a detector model.

FIG. 2 illustrates an example method 100 of generating a training dataset for a specific object for training a detection model for a detector, such as a parts-level detector. The method 100 is implemented for each desired object to be tracked from an image sequence that includes at least one image with the desired object. The method 100 is initiated at Block 102 and from Block 102 the method 100 receives an image sequence (Block 104) at Block 106. At Block 106, the desired object is highlighted in at least one of the images from the sequence in Block 104. In one example, the image from the sequence at or near a first appearance of the object is utilized to highlight the object. The object can be highlighted by a user of the computer system 30. In one example, the object is highlighted by a user with a bounding box 40 that surrounds the object in the image 38 (See FIG. 1). The user can create the bounding box by placing a rectangle in the image 38 that surrounds the desired object. A location in the image and size of the rectangle are recorded or tagged with the image and used to track the object in the other images in the image sequence at Block 108.

When the object is tracked between the sequence of images at Block 108, a location of the bounding box in the specific image and a size of the rectangle identified by the user from Block 106 are used by a tracking algorithm to "track" or follow the object of interest through the image sequence. For each image in the image sequence, the tracker will attempt to locate the same object of interest, and record information regarding the object of interest in the memory 34 of the computer system 30 associated with each image where the object was identified. The information tagged to each frame can include a location and size of the rectangle, a label identifying the object, such as a name or class of the object of interest, or a cropped image region of interest (ROI) with the object defined by the rectangle.

The object tracking process may be interrupted at Block 110 if the tracking algorithm has determined that the object of interest no longer exists in the image or is otherwise "lost" (e.g., this can be indicated by a confidence score below a set confidence threshold). Also, the user can intervene due to an error in the tracking results as judged by the user, e.g., when the tracker has locked on to an object other than the one the user initially selected.

At Block 112, the method 100 can return to Block 106 to modify the bounding box in the initial image identifying the object to improve the tracking of the object of interest again. Alternatively, when returning to Block 106, the user can select the image in the sequence where the object was lost by the tracking algorithm and highlight the correct object of interest in that image to allow the object to be tracked again in Block 108. The ability to restart the tracking algorithm at the place of failure and continue without having to reevaluate the same images from the image sequence again reduces time needed to evaluate the image sequence.

At Block 114, the location and size of the rectangle, label identifying the object, and the cropped image region for each image in the image sequence are collected. The user can review the region of interest from each image in the sequence at Block 116 to confirm that the correct object of interest is identified in the region of interest as part of finalizing the collected images with associated information. If any of the regions of interest did not identify the correct object of interest, those regions of interest can be deleted from the finalized images.

In one example, the user finalizes images by viewing them on the display 36 of the computer system 30. Once the user has confirmed that the correct regions of interest have been identified in the images, the finalized images are collected at Block 118 and the method can end at Block 120. The finalized images can be stored in the memory 34 of the computer system 30 or at another location, such as in the cloud. The finalized images form a training dataset for a parts-level or first-level detector for the object identified in the image sequence as described below.

The method 100 can be repeated for the same or different image sequences showing another object of interest or configuration of the object to form a training dataset for that specific object or configuration. Since the user involvement is limited to initiating the tracking of the object of interest, the method 100 eliminates the need for the user to identify the object of interest from each image in the image sequence by utilizing image tracking throughout the image sequence. This reduces the time and labor needed to create or update the training dataset for the object.

Tracking of the object of interest performed at least in Blocks 106 and 108 can be accomplished by many different available tracking algorithms, such as simple trackers based on a cross-correlation coefficient. These trackers can be used in situations where the appearance and position of the object of interest remains relatively stable. However, other tracker algorithms can be used depending on the object being tracked.

One feature of this disclosure is a simplified tracking procedure for the object of interest by treating a single object as a separate object to be tracked as it moves between different configurations or classes for the same object. Therefore, if objects of interest are positioned in different "configurations," they are defined as different "objects" for the object tracking that occurs in the method 100. For the example of objects associated with assembling the aircraft 22, aircraft wings 26 are presented in several different configurations such as when they are first towed to the factory floor ("delivered"), when they are lifted by a crane and moved to the support stands on the sides of fuselage (known as "loaded"), and when they are mated to the fuselage ("attached"). Therefore, a single object, the wing 26 would create three different configurations or classes with corresponding images sequences that would be evaluated by the method 100 to create different training datasets for each configuration.

In one example embodiment, at least one of the cameras 20-1, 20-2 captures an image of the assembly floor every 15 seconds. This reduces the burden of storing and processing large amounts of image data when the objects of interest are not moving quickly or frequently. In prior art approaches, tracking the movement of objects through discontinuous image frames was difficult to maintain at a high level of accuracy. However, this disclosure utilizes end states of where the objects of interest (in this example, the wings) are rather than how they are moved from one place to another during the assembly process. Therefore, having an object of interest in a "configuration" refers to the object in a particular state of assembly, e.g., "Wing LEFT Delivered", "Wing LEFT Loaded", etc.

Furthermore, an object of interest can be in different configuration even though its location has not changed. One example of such an object is a cradle 28 that supports a front end of the fuselage of the airplane 22. During the assembly process, the cradle 28 will transition from a configuration of supporting the weight of the fuselage ("Cradle Support Plane") to one of not supporting the fuselage ("Cradle Not Supp Plane"), leaving the fuselage to be supported by the front nose gear. This is called "Down jack" and is an important milestone in the assembly process of most airplanes 22 which can be identified by the detector model disclosed herein.

For object detection model training to occur, positive training datasets are created based on the results of the method 100. The positive training datasets include images containing positive training samples of the object tagged with a label identifying the object at a location of the object, and a size of every object of interest to be detected in each of the images. Also, datasets of images without positive training samples are useful for the training object detection models.

The positive training datasets can be generated from the method 100 discussed above and the no positive training samples can use images of the same assembly factory floor before the object of interest is loaded to the workspace and before any components to be detected are present. This ensures that samples will not include false negatives.

Regarding the tagged images, the tag-by-tracking process of the method 100 produces training datasets that are generated one object at a time for each (time-stamped) image in the image sequence that forms the training dataset. When the same image sequence is used to identify more than one object of interest, tags for different objects in the same image are merged into a single file for purposes of training the detection model. Also, if the tagging process is not exhaustive (i.e., if the process fails to tag some objects in some of the images, or some of the tagging results were accidently deleted), the training dataset may inadvertently create negative training examples from positive images, i.e., a false negative identification. That is, if the tag-by-tracking process of the method 100 fails to tag an object of interest in some images, a situation is created where the object exists but is not tagged, effectively making negative samples for training (i.e., telling the training algorithm for the detection model that the objects do not exist when in fact they do). This can cause harm to the training and reduce the performance of the resulting detection models.

To avoid inadvertently introducing negative training examples, an automated verification process is created in which such negative examples are eliminated. This process, as outlined below, requires a ground-truth timeline file to be created by examining each image sequence, and identifying and recording the times when each object first appears and when it disappears, or, broadly using the "generalized object detection" terminology, when a configuration becomes true for the related object and when the configuration is no longer true. This ground-truth timeline is stored in a "ground-truth" file. In the illustrated example, every image sequence in the training dataset will have a ground-truth file. The ground-truth timeline provides a verification process that eliminates false negatives from the training dataset and can easily create negative training data from using images with time stamps that include time intervals without the object of interest.

For a conventional object detection training approach, once the tagging process and the verification process are complete, a detector is trained using all the tagged training images in the training datasets less the ones excluded from the verification process described above. However, doing so puts a heavy burden on the tagging process even when we are using the semi-automated tagging process of the method 100, because it requires tagging every object of interest in every training image sequence used. As more training data will generally result in a better performing detection model, there is an intrinsic conflict between the need to have more training data and the exponential growth in the resource (time and effort) needed for tagging the objects in the training data.

This disclosure reduces the burden of tagging objects in training images by implementing a two-level detector training process that utilizes individual parts-level detectors and a unified or second level detector that can detect each object or objects from each of the individual parts-level detectors. The individual parts-level detectors are trained first, with each containing a small number of objects of interest and configurations followed by training the second level or unified detector that comprises all the objects of interest and corresponding configurations into a single detector.

For the parts-level detector training, a group of a small number of objects (often just one or two objects) and corresponding configurations are selected. For example, two configurations for the tail cone, such as "Tail Cone Delivered" and "Tail Cone Attached" are combined to train a single parts-level detector. In this example, only one actual object of interest, a Tail Cone, is involved, and the two configurations represent two stages in the assembly process to be monitored. A second example is the four states "Wing LEFT Delivered", "Wing RIGHT Delivered", "Wing LEFT Loaded" and "Wing RIGHT Loaded" combined into a single parts-level detector, which has two objects of interest, Wing LEFT and Wing RIGHT, each with two configurations.

For training data verification of the parts-level detector, a timeline for the ground-truth files is created for each of the training sequences as discussed above to eliminate any false negatives. Furthermore, a set of images that do not contain any objects detected in the parts-level detector is helpful to train the parts-level detector.

For the second level of the two-level detector training, the unified detector is trained. The unified detector includes all the objects of interest and corresponding configurations from the parts-level detectors. The unified detector can then be deployed to produce data for assembly process monitoring.

The two-level detector training processes allows the parts-level detector to be trained with much less training data. This is because each parts-level detector contains only a small number of objects of interest, such as one or two objects of interest, and the corresponding configurations for the objects of interest with only a subset of training data most relevant to these objects or configurations to be tagged. One feature of this is a reduction in tagging requirements compared with having to tag all the objects of interest and corresponding configurations in all training datasets. In one example, only two to four image sequences are tagged to create the training datasets for each parts-level detector.

The two-level detector training process is also faster because the parts-level detectors contain fewer objects of interest and configurations such that it is faster to train and achieve high levels of detection performance from smaller training datasets. Also, the parts-level detectors can be managed separately from each other and the second level unified detector. This allows for making incremental improvements to system performance possible by revising and improving the individual parts-level detectors independently and then re-training the unified detector from the revised parts-level detector.

Figure 3:
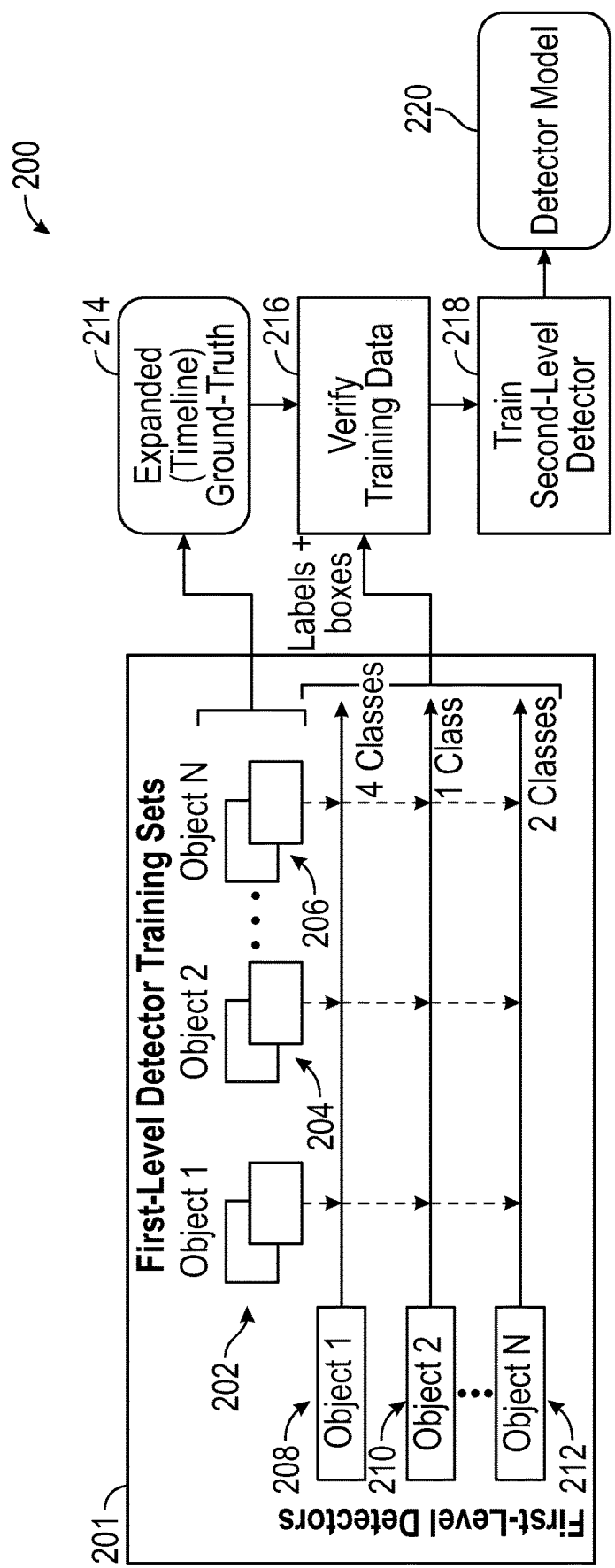
FIG. 3 illustrates an example method of training a detector model.

Furthermore, an example method 200 of training the second level or unified detector is illustrated in FIG. 3. The method 200 allows for an automated process of training the unified detector. Once the parts-level detectors 208, 210, 212 are trained, they are used to process all the training data 202, 204, 206 to produce "tags" for all the objects of interest and corresponding configurations needed (BLOCK 210) for training the unified detector.

With the method 200, the classes or configurations of the unified detector are the union of all the classes/configurations in the parts-level detectors. As such, the objects and configurations or classes included in each of the parts-level detectors are combined into a single unified detector that will be able to detect each of the objects corresponding configurations.

Additionally, the training data utilized for training the parts-level detector is augmented at Block 201 before being used to train the unified detector. This is because image tagging for the specific training dataset is only performed for the objects that the parts-level detector is training for. Therefore, if an image contains a first object that is not detected by parts-level detector, that image cannot be used for training the unified detector unless the first object is also identified in the image. Otherwise, the first object in the image will create a false negative example for training as discussed above. To eliminate the false negative examples for training the unified detector, the parts-level detectors are used to generate tags for all the image sequences used to generate each of the individual parts-level detectors.

As shown in FIG. 3, Block 201 applies the trained parts-level detectors to all training data (originally collected for the parts-level detector training) and detects all objects in each of the image sequences. This allows additional training data not used before if necessary (e.g., those that we put aside for testing the parts-level detectors). This step generates tags for the training images automatically. The parts-level detectors trained with the above approach are very effective at detecting the objects in the images they are trained on and new images they are not trained on as well. This provides consistent and high-quality "tags" in terms of the class labels and the object bounding boxes (i.e., the "tags") associated with each of the images.

The method 200 verifies the training data (Block 216) against an expanded (timeline) ground-truth from Block 214. For the purposes of training the parts-level detectors, the ground-truth timeline only included the objects contained in the specific parts-level detector. However, for the unified detector, the ground truth is expanded to include all objects of the unified detector, which includes all objects in all parts-level detectors. As in the case for parts-level detectors, the verification process produces a set of images (with tags produced by the parts-level detectors) that are used as training data, and a set of images that can be used as negative training samples.

The amount of training data created at Block 216 can be several times larger than the sum of training data used in the parts-level detector training, which contributes to higher quality (unified) detector as a result. With the training data developed at Block 216, the unified or second-level detector can be trained at Block 218 to create the detector model at Block 220 for process monitoring of assembly lines on a factory floor or any other location.

Figure 4:
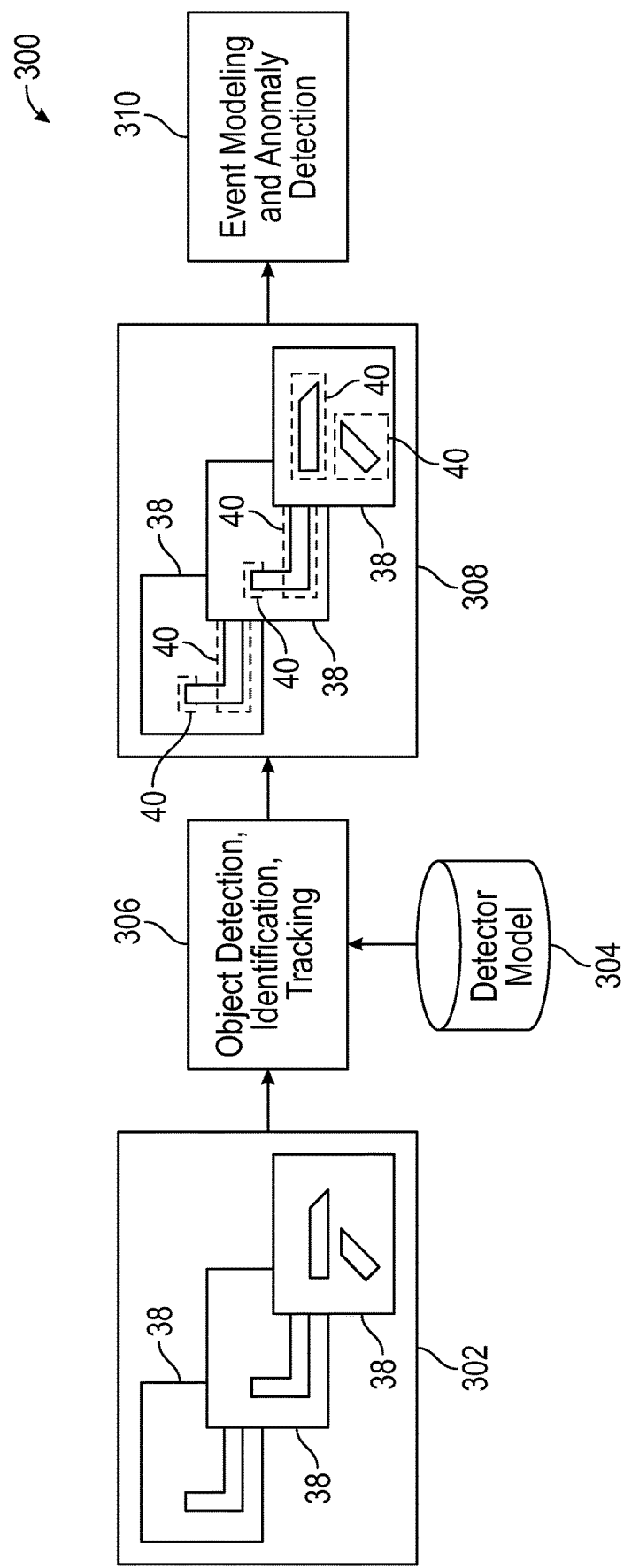
FIG. 4 illustrates a method of performing event modeling and anomaly detection.

FIG. 4 illustrates an example method 300 for monitoring an assembly process. The method 300 monitors the assembly process by performing event modeling and anomaly detection of the assembly process. In one example, the assembly process is of the aircraft 22 on the assembly line 24 and the monitoring is performed with a detector model, such as the unified detector described above. However, the method 300 can be used to monitor the process of assembling other components. The method 300 utilizes data provided by the detector model to detect events related to the assembly activities that are abnormal based on historical or procedure precedence, either in a time or in a spatial (location) domain.

As shown in FIG. 4, the event modeling and anomaly detection begins with collecting an input image sequence at Block 302. The input image sequence can include live images or stored images that were previously collected. When modeling an assembly process to determine a time sequence of events for the assembly process, the image sequence can include images captured over an extended period of time. The extended period of time depends on a length of time needed for the assembly process to complete at least one build cycle and a number of cycles desired to create the model of the assembly process. When the method 300 considers a larger number of build cycles, the method 300 can generate a more accurate model of the assembly process.

A detector model (Block 304), such as the unified detector described above, performs at least one of object detection, identification, or tracking to produce detection results at Block 308. The detection results produced at Block 306 by the detector model analyzing the image sequence can include tags identifying the object detected plus a size and location of object detected for every image in the input image sequence. The detection results illustrated in Block 308 can also include the object(s) highlighted, such as by a bounding box 40, in each specific image 38 in the image sequence to allow a user to review the object(s) detected in each of the images in the image sequence.

The above information from the detection results in Block 308 can be used by the method 300 to perform postprocess analysis for at least one of event modeling or anomaly detection at Block 310. For anomaly detection to occur, the event model determining a normal assembly process for each of the objects must be generated. The detection results from Block 308 generated by the detector model include time sequence timestamps in addition to the object identifier, size, and location of the object detected and being assembled. The time sequence data is used to build event models of the assembly process by associating the detection of objects with events in a time domain that will enable anomaly detection as discussed further below.

Figures 5, 6:
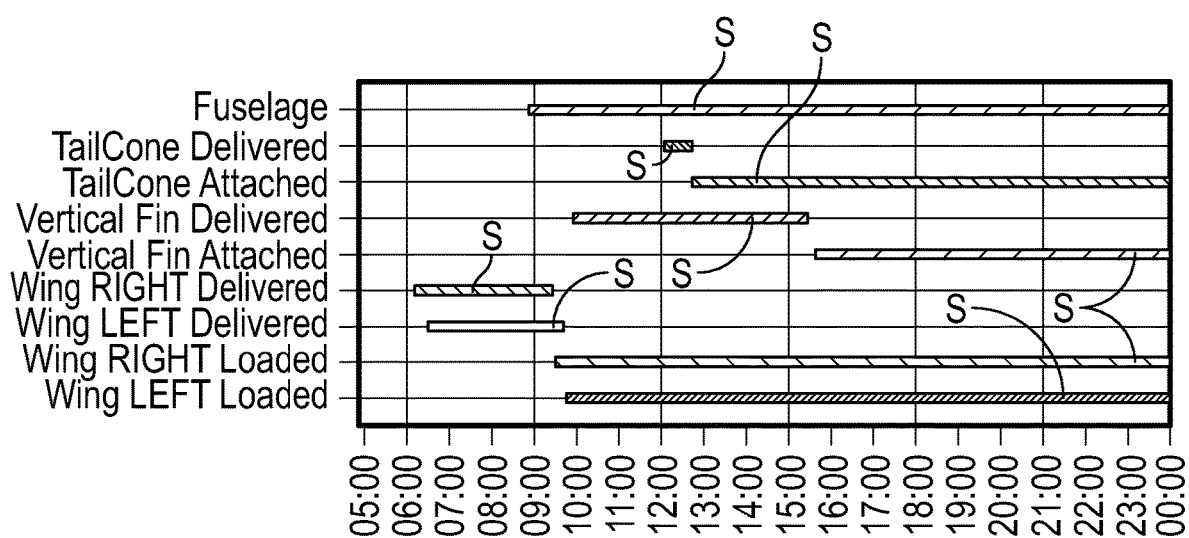
FIG. 5 illustrates a table of example configurations from an assembly process.
FIG. 6 illustrates a plot representing assembly activities by linking the starting time and the end time for each of the configurations shown in FIG. 5.

FIG. 5 provides an example table of configurations for multiple objects, for an example assembly process of the aircraft 22. While the table in FIG. 5 only identifies a handful of configurations to be tracked and associated with events in the assembly process of the aircraft 22, this disclosure is not limited to the configurations listed in the table or to assembly of aircraft but rather any assembly process that can be used in connection with object detection. For example, the table in FIG. 5 tracks a fuselage, tail cone delivered, tail cone attached, right wing delivered, left wing delivered, right wing loaded, and left wing located. The image sequence from Block 302 provided to the method 300 when creating the event model can include a plurality of assembly processes for the aircraft 22 to create a larger sample size of data to base the event model on.

As the detector model from Block 304 analyzes the image sequence for generating the event model, the method 300 will produce various detections reflecting progress of the assembly process. For example, when the fuselage is loaded to the station, the fuselage will be detected as "Fuselage" in the table in FIG. 5. Likewise, when the tail cone is delivered to the station, "Tail Cone Delivered" will be detected. At any time in the assembly process, a subset of the configurations shown in FIG. 5 can describe the state of the assembly within the scope of the application setting.

One property of the configurations listed in FIG. 5 is persistence. When each of the configurations become true according to the detector results from Block 308, they will persist for some unspecified amount of time as determined by the nature of physics (i.e., "Tail Cone Delivered" will continue to be true until someone moves the tail cone). The opposite is also true. 10075| That is, if a configuration becomes false (from true), it will keep being false for some unspecified amount of time. However, due to variations in output of the detection model, the output results from the detection model may not always be continuously true or false in every time step of the output results. That is, the output of the detector model may drop out after initially saying an object has been detected, or vice versa, which is not reflective of the real-world situation.

To filter out such errors in detection from the detection model, a state machine is used in connection with the configurations listed in FIG. 5. The state machine is designed to filter out occasional drop outs from the detection results and false positives (detections that do not correspond to real objects). When the discrete output of configurations listed in FIG. 5 from the detector model is fed to the state machine. The output of the state machine is a cleaned-up version of the original output from the detector model.

Equation (1) represents an example implementation of a function for the state machine. For Equation (1) below, $C(t) \in \{true, false\}$ is the input to the state machine representing any configuration C listed in FIG. 5 with t representing the discrete time step corresponding to the time of the image in the image sequence, and $T>0$ is a time step threshold (persistency threshold) for the state machine.

$$SC(\tau) = \begin{cases} true, & \text{if } CC(tt) = true, tt = \tau, \tau-1, \ldots, \tau-T-1 \\ false, & \text{if } C(t) = false, t = \tau, \tau-1, \ldots, \tau-T-1, \ldots, N \\ S(\tau-1), & \text{otherwise}; S(0) = false \end{cases} \quad (1)$$

In the above equation, $S_C(\cdot)$ is the output of the state machine and N is the length of the input image sequence. In other words, the output of the state machine is true only if the input C(t) from current and past T−1 time steps are true; otherwise, the output of the state machine is false if the input C(t) from current and past T−1 time steps are false. In all other cases, the state machine output remains unchanged. The state machine as shown by Equation (1) filters the output of all objects or configurations shown in FIG. 5 independent of each other and uses the output $S_C(\cdot)$ for the next step. An example persistence threshold is 5-time steps. However, the persistence threshold could include more or less time steps.

FIG. 6 illustrates a plot representing assembly activities by linking the starting time and the end time for each of the configurations shown in FIG. 5. In other words, the lines span the duration when the objects or configurations identified on the vertical axis are true.

When an assembly is made one at a time, like an aircraft being assembled one at a time, from fuselage, and the wings, to the vertical fin and the tail cone, etc., the sequence of detections can be represented in terms of similar units. After the sequence of detections from detection model are filtered as described, the sequences are organized into "segments" S, each starting shortly after the previous assembly at the assembly station has been moved to the next station and ends right after the assembly itself is moved. Furthermore, the detections can be represented in a compressed form (due to the persistency discussed earlier) by recording the start time and the end time of each configuration shown in FIG. 5.

In the preceding discussion above, whenever time of an event is mentioned (e.g., an object or configuration in FIG. 5 becomes true), it was understood that they are discrete times when the corresponding images were taken. For modeling the assembly process, it can be convenient to have a common reference for these discrete times for comparison and analysis. Within each segment, a reference start time (e.g., time=0) is selected which corresponds to when the reference object or configuration is loaded. Then the start and end time of all other events relative to it are expressed relative to the start time of the reference object or configuration.

For the following discussion, unless stated otherwise, the word "time" always refers to the relative time of the events within a segment. FIG. 7 illustrates the concept of event relative times in an example activity plot. Because time is relative, time can become negative, as in the cases for the "Wing RIGHT Delivered" and "Wing LEFT Delivered" as they become true before Fuselage is loaded and becomes true.

In one example, a model of the events representing a normal assembly process can be collected over an extended period of time, such as over several months, using the unified detector. With the information gathered from the unified detector, an assembly period for each component can be split into sequences (e.g., individual aircraft assembly process from Fuselage Load to Line Move) and compute the (relative) times of all the events for the configurations listed in FIG. 5. Equation (2) represents an equation for an example statistical analysis to determine the relative times and when gathering time statistics for each of the characteristics in FIG. 5.

In Equations (2-3) $T_C$ is the (relative) time of an event representing the start time of configuration the C, a MAD (median absolute deviation) based approach is used to estimate the time distribution of $T_C$, $N$ ($m_c$, $\sigma_c$), as shown below:

$$m_c = \text{median}(\{T_C | \forall \text{ segments}\}) \quad (2)$$

$$MAD = \text{median}(\{\text{abs}(T_C - m_c) | \forall \text{ segments}\}) \quad (3)$$

-continued $$\sigma_c = 1486 * MAD \quad (4)$$

In Equation (2) above, median (•) is a function calculating the median of the set of values in the argument. FIG. 7 illustrates a graphical representation of the distribution models of the start time of the objects or configurations in FIG. 5, shown as crosses for $m_c$ and $\pm\sigma_c$ (Equation 4), and as boxes the min/max bounds of $T_C$ after outlier rejection (by removing those with a deviation from $m_c$ that is greater than $3*\sigma_c$).

For each event related to one of the configurations shown in FIG. 5, pre-calculate the time limit (relative to fuselage start-time) when the configuration should happen. In one example, this is calculated with Equation (3) below.

$$T_{c,max} = m_c + 3 * \sigma_c \quad (5)$$

With the above statistically based event model generated from Equation (2) and as shown in examples in FIG. 7, anomalies can be detected when events in a segment do not fall into the normal range as described by the event model. For example, if an event happens whose (relative) time deviates from the mean (m) more than 3 times the standard deviation ($3*\sigma$), that event is declared as an anomaly.

FIG. 8 shows all the anomalous events (as "*") over a period of time that the data was collected, along with their expected distributions (same as shown in FIG. 7). In the illustrated example, only the events that are late, such as objects or configurations not becoming true at 3 times the standard deviation, are shown. This is because if the deviation from the mean is negative, the event would have happened earlier than the mean and can indicate that the object or configuration became true early which is less of a concern than becoming true late.

The results shown in FIG. 7 can be obtained off-line when the data is gathered beforehand. The event models are estimated from Equations (2-4) for each of the desired configurations. The event model for each configuration is used to generate alerts for anomalous events for corresponding objects or configurations. In one example, the alerts can be calculated in an on-line or cloud mode in real time from a live feed of images at Block 302 with the detection results from Block 308 streaming into Block 310 as shown in FIG. 4. Any anomalies detected at Block 310 can then be reported as alerts or tracked for monitoring the assembly process. The following Clauses provide example configurations of systems and methods for obtaining grazing angle measurements with the system 20 of FIG. 1.

Clause 1: A method of monitoring an assembly process, the method comprising: obtaining an event model for each of a plurality of objects in the assembly process, wherein the event model for each of the plurality of objects includes a predetermined time frame for a change in presence to occur; collecting an image sequence of the assembly process for monitoring; identifying if a change in presence for each of the plurality of objects occurred with a detector model; reviewing the event model for each of the plurality of objects to determine if the predetermined time frame lapsed without the change in presence of a corresponding one of the plurality of objects being identified; and issuing an alert if the predetermined time frame lapsed without the presence of a corresponding one of the plurality of objects being identified.

Clause 2: The method of clause 1, wherein results from the detector model identifying the change in presence for each of the plurality of objects is filtered with a state machine based on if the objected was detected in at least one image proceeding or following.

Clause 3: The method of clauses 1-2, wherein identifying the change in presence for each of the plurality of objects includes determining a time when each of the plurality of objects either appeared or disappeared from the image sequence.

Clause 4: The method of clauses 1-3, wherein the time is based on a relative time set by the change in presence of one of the plurality of objects.

Clause 5: The method of clauses 1-4, wherein the plurality of objects includes multiple configurations of a single object.

Clause 6: The method of clauses 1-5, wherein collecting the image sequence of the assembly process occurs in real time.

Clause 7: The method of clauses 1-6, wherein the event model for each of the plurality of objects is generating by: receiving at least one training image sequence having a plurality of occurrences of the assembly process illustrating each of the plurality of objects; utilizing the detector model to identify the presence of each of the plurality of objects in the at least one training image sequence; and generating the event model corresponding to each of the plurality of objects based on a statistical prediction for when the object should appear in the training image sequence.

Clause 8: The method of clauses 1-7, wherein the statistical prediction includes a predetermined time frame for the presence of a corresponding one of the plurality objects.

Clause 9: The method of clauses 1-8, wherein the predetermined time frame is based on three times a standard deviation of a mean occurrence time for the presence of a corresponding one of the plurality of objects.

Clause 10: The method of clauses 1-9, wherein the predetermined time frame includes a relative time based on the presence of one of the plurality of objects.

Clause 11: The method of clauses 1-10, wherein the plurality of occurrences of the assembly process includes historical occurrences of the assembly process.

Clause 12: The method of clauses 1-11, wherein the detector model is trained by: obtaining a separate training dataset corresponding to each of the plurality of objects with each of the separate training datasets including a set of tagged images identifying a corresponding one of the plurality of objects; training a parts-level detectors based on each of the separate training dataset; training the detector model based on each of the parts-level detectors.

Clause 13: The method of clauses 1-12, wherein the separate training dataset are created by: receiving separate image sequences for each of the plurality of objects with a corresponding one of the plurality of objects identified in at least one image of the separate image sequence; tracking the each of the plurality of objects identified in the at least one image in a corresponding one of the separate image sequences; tagging a region of interest in each image in the separate image sequences where a corresponding one of each of the plurality of objects was tracked; and creating the separate training dataset for each of the plurality of objects by collecting the region of interest from each image in each of the separate image sequences where the corresponding object was tracked.

Clause 14: The method of clauses 1-13, wherein obtaining the separate training dataset corresponding to each of the plurality of objects includes eliminating false negative tags by verifying a presence of each of the plurality of objects in each of the plurality of training dataset against a ground-truth timeline for each of the plurality of objects.

Clause 15: A system for detecting objects in an assembly process, the system comprising: at least one camera configured to capture a plurality of images; and a controller configured to: obtain an event model for each of a plurality of objects in the assembly process, wherein the event model for each of the plurality of objects includes a predetermined time frame for a change in presence to occur; collect an image sequence of the assembly process for monitoring; identify if a change in presence for each of the plurality of objects occurred with a detector model; review the event model for each of the plurality of objects to determine if the predetermined time frame lapsed without the change in presence of a corresponding one of the plurality of objects being identified; and issue an alert if the predetermined time frame lapsed without the presence of a corresponding one of the plurality of objects being identified.

Clause 16: The system of clause 15, wherein results from the detector model identifying the change in presence for each of the plurality of objects is filtered with a state machine based on if the objected was detected in at least one image proceeding or following.

Clause 17: The system of clauses 15-16, wherein the event model for each of the plurality of objects is generating by: receiving at least one training image sequence having a plurality of occurrences of the assembly process illustrating each of plurality of objects; utilizing the detector model to identify the presence of each of the plurality of objects in the at least one image sequence; and generating the event model corresponding to each of the plurality of objects based on a statistical prediction for when the object should appear in the training image sequence.

Clause 18: A non-transitory computer-readable storage medium embodying programmed instructions which, when executed by a processor, are operable for performing a method comprising: obtaining an event model for each of a plurality of objects in an assembly process, wherein the event model for each of the plurality of objects includes a predetermined time frame for a change in presence to occur; collecting an image sequence of the assembly process for monitoring; identifying if a change in presence for each of the plurality of objects occurred with a detector model; reviewing the event model for each of the plurality of objects to determine if the predetermined time frame lapsed without the change in presence of a corresponding one of the plurality of objects being identified; and issuing an alert if the predetermined time frame lapsed without the presence of a corresponding one of the plurality of objects being identified.

Clause 19: The non-transitory computer-readable storage medium of clause 18, wherein the event model for each of the plurality of objects is generating by: receiving at least one training image sequence having a plurality of occurrences of the assembly process illustrating each of plurality of objects; utilizing the detector model to identify the presence of each of the plurality of objects in the at least one image sequence; and generating the event model corresponding to each of the plurality of objects based on a statistical prediction for when the object should appear in the training image sequence.

Clause 20. A non-transitory computer-readable storage medium of clauses 18-19, wherein the detector model is trained by: obtaining a separate training dataset corresponding to each of the plurality of objects with each of the separate training datasets including a set of tagged images identifying a corresponding one of the plurality of objects; training a parts-level detectors based on each of the separate training datasets; training the detector model based on each of the parts-level detectors.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

The invention claimed is:

1. A method of monitoring an assembly process, the method comprising:
generating an event model for each of a plurality of objects by:
receiving at least one training image sequence having a plurality of occurrences of the assembly process illustrating each of the plurality of objects,
identifying a presence of each of the plurality of objects in the at least one training image sequence, and
generating the event model corresponding to each of the plurality of objects based on a statistical prediction for when the object should appear in the training image sequence;
obtaining the event model for each of the plurality of objects in the assembly process, wherein the event model for each of the plurality of objects includes a predetermined time frame for a change in presence to occur;
collecting an image sequence of the assembly process for monitoring;
identifying if a change in presence for each of the plurality of objects occurred with a detector model;
reviewing the event model for each of the plurality of objects to determine if the predetermined time frame lapsed without the change in presence of a corresponding one of the plurality of objects being identified; and
issuing an alert if the predetermined time frame lapsed without the presence of the corresponding one of the plurality of objects being identified.

2. The method of claim 1, wherein results from the detector model identifying the change in presence for each of the plurality of objects is filtered with a state machine based on if one of the plurality of objects was detected in at least one image proceeding or following.

3. The method of claim 1, wherein identifying the change in presence for each of the plurality of objects includes determining a time when each of the plurality of objects either appeared or disappeared from the image sequence.

4. The method of claim 3, wherein the time is based on a relative time set by the change in presence of one of the plurality of objects.

5. The method of claim 1, wherein the plurality of objects includes multiple configurations of a single object.

6. The method of claim 1, wherein collecting the image sequence of the assembly process occurs in real time.

7. The method of claim 1, wherein
identifying the presence of each of the plurality of objects comprises utilizing the detector model to identify the presence of each of the plurality of objects in the at least one training image sequence.

8. The method of claim 1, wherein the statistical prediction includes a predetermined time frame for the presence of the corresponding one of the plurality of objects.

9. The method of claim 8, wherein the predetermined time frame is based on three times a standard deviation of a mean occurrence time for the presence of the corresponding one of the plurality of objects.

10. The method of claim 8, wherein the predetermined time frame includes a relative time based on the presence of one of the plurality of objects.

11. The method of claim 1, wherein the plurality of occurrences of the assembly process includes historical occurrences of the assembly process.

12. The method of claim 7, wherein the detector model is trained by:
obtaining a separate training dataset corresponding to each of the plurality of objects with each of the separate training datasets including a set of tagged images identifying a corresponding one of the plurality of objects;
training parts-level detectors based on each of the separate training datasets; and
training the detector model based on each of the parts-level detectors.

13. The method of claim 12, wherein each of the separate training datasets are created by:
receiving separate image sequences for each of the plurality of objects with a corresponding one of the plurality of objects identified in at least one image of the separate image sequence;
tracking each of the plurality of objects identified in the at least one image in a corresponding one of the separate image sequences;
tagging a region of interest in each image in the separate image sequences where a corresponding one of each of the plurality of objects was tracked; and
creating the separate training dataset for each of the plurality of objects by collecting the region of interest from each image in each of the separate image sequences where a corresponding object was tracked.

14. The method of claim 13, wherein obtaining the separate training datasets corresponding to each of the plurality of objects includes eliminating false negative tags by verifying a presence of each of the plurality of objects in each of the separate training datasets against a ground-truth timeline for each of the plurality of objects.

15. A system for detecting objects in an assembly process, the system comprising:
at least one camera configured to capture a plurality of images; and
a controller configured to:
generate an event model for each of a plurality of objects by:
receiving at least one training image sequence having a plurality of occurrences of the assembly process illustrating each of the plurality of objects,
identifying a presence of each of the plurality of objects in the at least one training image sequence, and
generating the event model corresponding to each of the plurality of objects based on a statistical prediction for when the object should appear in the training image sequence;
obtain the event model for each of the plurality of objects in the assembly process, wherein the event model for each of the plurality of objects includes a predetermined time frame for a change in presence to occur;
collect an image sequence of the assembly process for monitoring;
identify if a change in presence for each of the plurality of objects occurred with a detector model;
review the event model for each of the plurality of objects to determine if the predetermined time frame lapsed without the change in presence of a corresponding one of the plurality of objects being identified; and
issue an alert if the predetermined time frame lapsed without the presence of the corresponding one of the plurality of objects being identified.

16. The system of claim 15, wherein results from the detector model identifying the change in presence for each of the plurality of objects is filtered with a state machine based on if one of the plurality of objects was detected in at least one image proceeding or following.

17. The system of claim 15, wherein
identifying the presence of each of the plurality of objects comprises utilizing the detector model to identify the presence of each of the plurality of objects in the at least one image sequence.

18. A non-transitory computer-readable storage medium embodying programmed instructions which, when executed by a processor, are operable for performing a method comprising:
generating an event model for each of a plurality of objects by:
receiving at least one training image sequence having a plurality of occurrences of an assembly process illustrating each of the plurality of objects,
identifying a presence of each of the plurality of objects in the at least one training image sequence, and
generating the event model corresponding to each of the plurality of objects based on a statistical prediction for when the object should appear in the training image sequence;
obtaining the event model for each of the plurality of objects in the assembly process, wherein the event model for each of the plurality of objects includes a predetermined time frame for a change in presence to occur;
collecting an image sequence of the assembly process for monitoring;
identifying if a change in presence for each of the plurality of objects occurred with a detector model;
reviewing the event model for each of the plurality of objects to determine if the predetermined time frame lapsed without the change in presence of a corresponding one of the plurality of objects being identified; and
issuing an alert if the predetermined time frame lapsed without the presence of the corresponding one of the plurality of objects being identified.

19. The non-transitory computer-readable storage medium of claim 18, wherein
identifying the presence of each of the plurality of objects comprises utilizing the detector model to identify the presence of each of the plurality of objects in the at least one image sequence.

20. The non-transitory computer-readable storage medium of claim 19, wherein the detector model is trained by:
obtaining a separate training dataset corresponding to each of the plurality of objects with each of the separate training datasets including a set of tagged images identifying a corresponding one of the plurality of objects;

training parts-level detectors based on each of the separate training datasets; and training the detector model based on each of the parts-level detectors.

\* \* \* \* \*